(12) United States Patent
Gardiner et al.

(10) Patent No.: US 9,932,106 B1
(45) Date of Patent: Apr. 3, 2018

(54) SECURING HYDRAULIC LINES IN AN AIRCRAFT

(71) Applicant: The Boeing Company, Chicago, IL (US)

(72) Inventors: Jim Edward Gardiner, Everett, WA (US); Mark W. Lesyna, Everett, WA (US)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 13/924,338

(22) Filed: Jun. 21, 2013

(51) Int. Cl.
  *F16L 3/22* (2006.01)
  *B64C 3/18* (2006.01)
  *F16L 3/00* (2006.01)

(52) U.S. Cl.
  CPC ............... *B64C 3/187* (2013.01); *F16L 3/00* (2013.01)

(58) Field of Classification Search
  USPC .................... 248/68.1, 65, 56; 174/151
  See application file for complete search history.

(56) References Cited

U.S. PATENT DOCUMENTS

| | | | | |
|---|---|---|---|---|
| 2,813,692 A | * | 11/1957 | Peterson et al. | 248/56 |
| 3,592,427 A | * | 7/1971 | Misuraca | 248/68.1 |
| 4,289,288 A | * | 9/1981 | Gransberry et al. | 248/56 |
| 8,356,842 B2 | | 1/2013 | Carns et al. | |
| 2006/0192053 A1 | * | 8/2006 | Crangle et al. | 244/135 R |
| 2008/0243455 A1 | * | 10/2008 | Wood | 703/7 |
| 2012/0280092 A1 | * | 11/2012 | Barre et al. | 248/68.1 |

* cited by examiner

*Primary Examiner* — Steven M Marsh
(74) *Attorney, Agent, or Firm* — Miller, Matthias & Hull LLP

(57) ABSTRACT

A hydraulic line is secured to a stiff conduit extending between aircraft frame members.

18 Claims, 9 Drawing Sheets

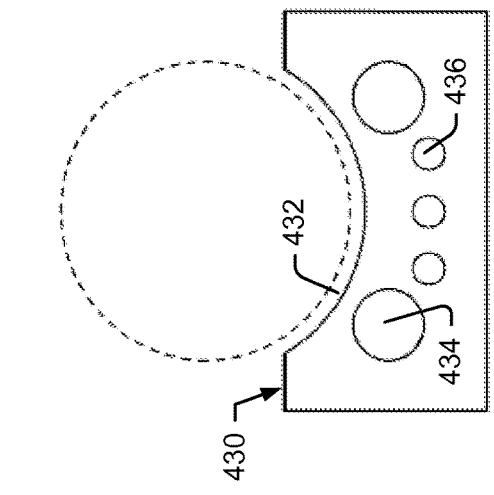
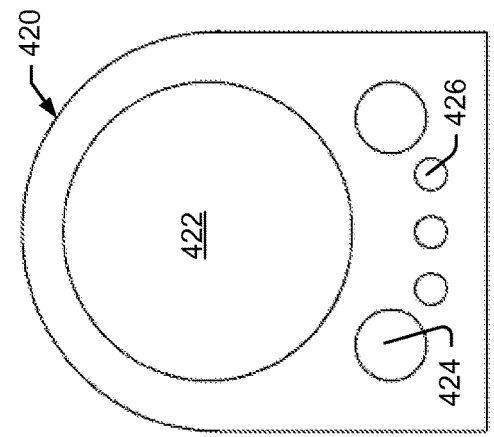
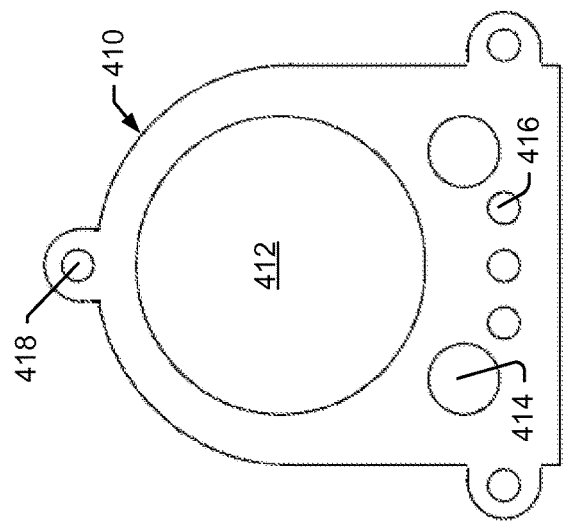

SECURING HYDRAULIC LINES IN AN AIRCRAFT

BACKGROUND

Commercial aircraft may include hydraulic systems installed inside wing assemblies. The hydraulic systems include hydraulic lines that are typically supported with brackets. The brackets are attached to ribs, spars, and skin panels.

The hydraulic lines are routed around pre-designed structures and obstacles. The lines are lengthened and multiple bends in the lines are made to traverse these obstacles.

The increased length increases pressure losses as fluid travels through the hydraulic lines. The hydraulic lines may be upsized to restore performance.

The brackets and the upsized, lengthened lines add weight to the aircraft. The added weight increases aircraft fuel costs.

The hydraulic lines and brackets are also time consuming to install. This increases aircraft fabrication and maintenance costs.

It would be desirable to reduce these costs.

SUMMARY

According to an embodiment herein, a method comprises securing a hydraulic line to a stiff conduit extending between aircraft frame members.

According to another embodiment herein, an aircraft comprises frame members, a stiff conduit extending through the frame members, and hydraulic lines extending through the frame members. The aircraft further comprises a plurality of brackets that secure the hydraulic lines to the stiff conduit.

According to another embodiment herein, a module for an aircraft consists of a stiff aircraft fuel line, hydraulic lines, electrical wires, and a plurality of brackets securing the hydraulic lines and the wires to the stiff fuel line.

These features and functions may be achieved independently in various embodiments or may be combined in other embodiments. Further details of the embodiments can be seen with reference to the following description and drawings.

BRIEF DESCRIPTION OF THE DRAWINGS

FIGS. 4A, 4B, and 4C are illustrations of brackets for securing hydraulic lines to a stiff conduit in an aircraft wing.

DETAILED DESCRIPTION

Figure 1:
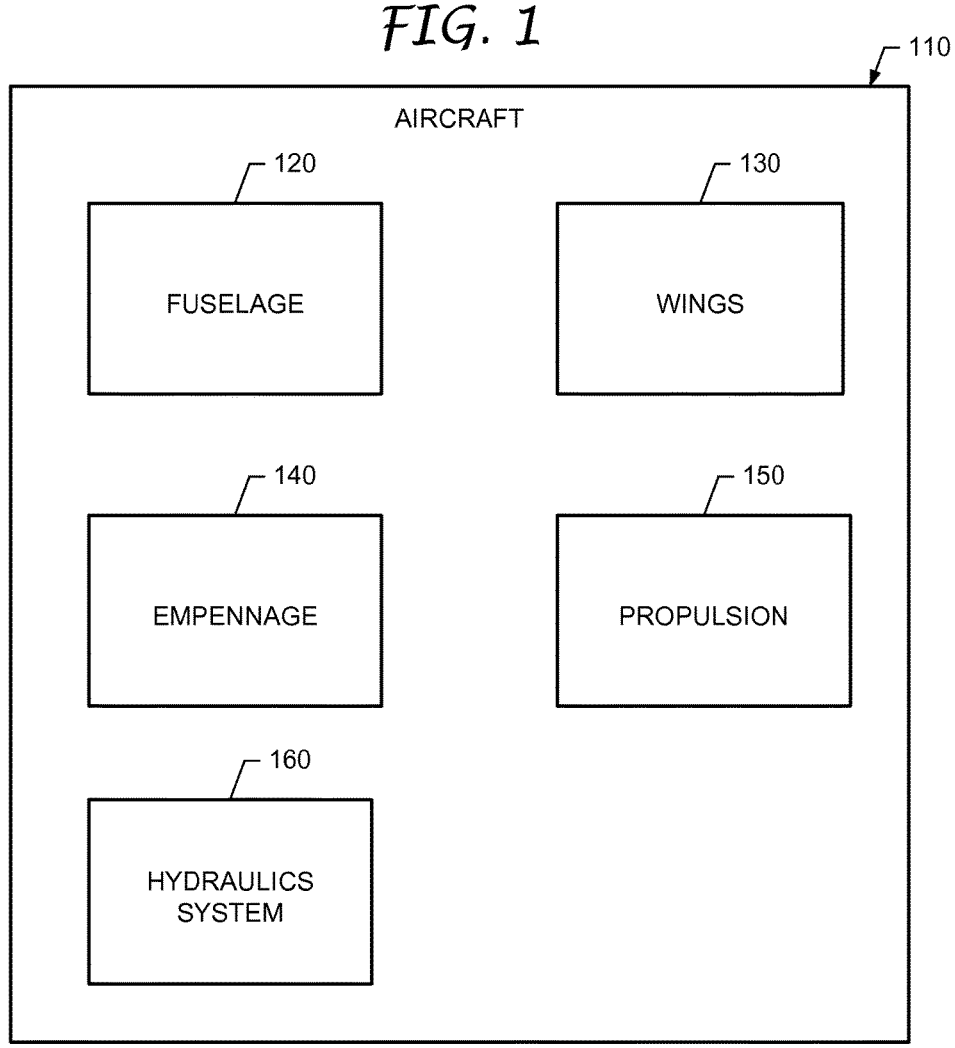
FIG. 1 is an illustration of an aircraft.

Referring to FIG. 1, an aircraft 110 includes a fuselage 120, wings 130, empennage 140, and propulsion system 150. The fuselage 120 includes frame members such as hoop frames, stringers, floor beams, and pressure bulkheads. The wings 130 and empennage 140 include frame members such as spars, ribs, and stringers. The aircraft 110 further includes a hydraulic system 160 for use primarily on flight controls in the wings 130 and landing gear, which is typically in the fuselage 120. The hydraulic system 160 includes hydraulic lines that carry hydraulic fluid.

Figure 2:
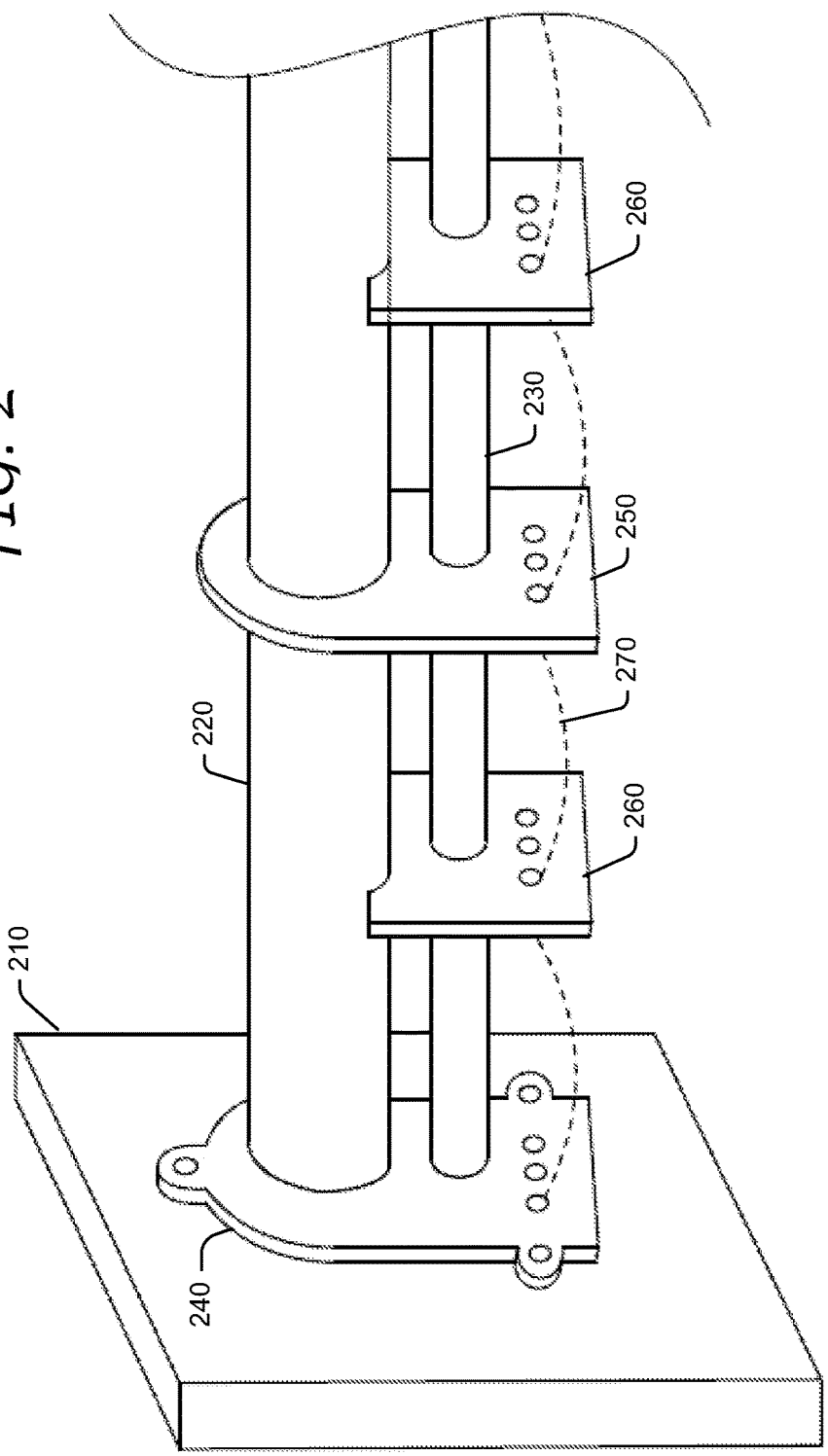
FIG. 2 is an illustration of a stiff conduit extending between frame members of an aircraft, and a hydraulic line secured to the stiff conduit.

Reference is made to FIG. 2, which illustrates an aircraft frame member 210 and a stiff conduit 220 extending between that frame member 210 and another frame member 210 (not shown). Examples of the stiff conduit 220 include, but are not limited to a fuel line, a fuel vent, and a nitrogen generation system (NGS) tube.

FIG. 2 also illustrates a hydraulic line 230. The stiff conduit 220 is substantially stiffer than the hydraulic line 230. The stiff conduit 220 can span the distance between the frame members 210 without sagging, whereas the hydraulic line 230 cannot. The stiff conduit 220 does not bend or move appreciably between the frame members 210 during operation of the aircraft, whereas the hydraulic line 230 tends to bend and move in response to hydraulic fluid pressure changes.

The hydraulic line 230 is secured to the stiff conduit 220 by one or more brackets. Three types of brackets 240, 250 and 260 are illustrated in FIG. 2. The first type of bracket 240 secures the hydraulic line 230 to the stiff conduit 220, and also secures the stiff conduit 220 to the frame members 210. The second type of bracket 250 only secures the hydraulic line 230 to the stiff conduit 220.

The brackets 240, 250 and 260 may be made of an electrically non-conductive material. Examples of the non-conductive material include, but are not limited to, nylon and polyether ether ketone (PEEK).

In some embodiments, the frame members 210 are made of a metal (e.g., ribs made of aluminum) and the stiff conduit 220 is also made of metal. The electrically non-conductive brackets 240 electrically isolate the stiff conduit 220 from the metal frame members 210.

In some embodiments, the frame members 210 are made of a fiber-reinforced composite material, and the stiff conduit 220 is made of a metal. If the composite material comes in direct contact with metal, it causes galvanic corrosion of the metal. For those embodiments, the electrically non-conductive brackets 240 also separate the composite from the metal and thereby protect against the galvanic corrosion.

In addition to securing the hydraulic line 230 to the stiff conduit 220, the first and second brackets 240 and 250 also provide two levels of isolation from electromagnetic effects (EME). If one of the brackets breaks, the others will prevent the hydraulic line 230 from touching the stiff conduit 220. The third type of bracket 260 does not secure the hydraulic line 230 to the stiff conduit 220, but it does provide a third level of EME isolation. The third type of bracket 260 functions as a spacer, separating the hydraulic line 230 from the stiff conduit 220 in the event the first and second types of brackets 240 and 250 fail.

These brackets 240-260 can also secure other items to the stiff conduit 220. For example, the brackets 240-260 can secure electrical wires 270 to the stiff conduit 220. The brackets 240-260 can secure individual wires, or wire bundles, or both.

FIG. 4A illustrates a bracket 410 for securing two hydraulic lines and three wires to the stiff conduit, and also for securing the stiff conduit to a frame member. The bracket 410 includes openings 412, 414, and 416 for the stiff conduit, hydraulic lines, and wires, respectively. The bracket 410 also includes openings 418 for fasteners, which fasten the bracket 410 to a frame member.

FIG. 4B illustrates a bracket 420 for securing two hydraulic lines and three wires to a stiff conduit, but not for securing the stiff conduit to a frame member. The bracket 420 includes openings 422, 424, and 426 for the stiff conduit, hydraulic lines, and wires, respectively. The bracket 420 of FIG. 4B is smaller and lighter than the bracket 410 of FIG. 4A. It provides mid span support between frame members.

FIG. 4C illustrates a bracket 430 for spacing two hydraulic lines apart from the stiff conduit. The bracket 430 includes a curved 432 surface that rests against the conduit (shown in phantom), but is not attached to the conduit. The bracket also includes openings 434 for two hydraulic lines and openings 436 for three wires or wire bundles. The bracket 430 of FIG. 4C is smaller and lighter than the bracket 420 of FIG. 4B.

All three brackets 410, 420 and 430 may provide additional EME isolation. The openings may set a minimum gap sufficient to electrically separate the conduit and the hydraulic line. An example is illustrated in FIG. 5.

Figure 5:
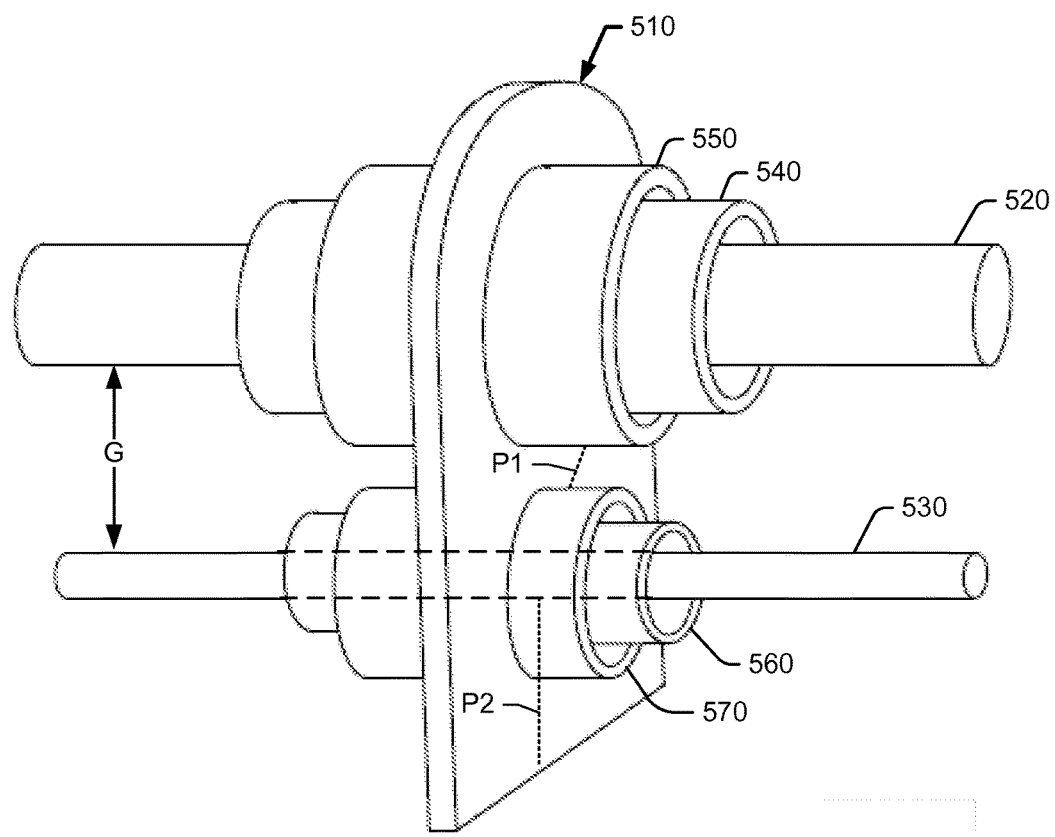
FIG. 5 is an illustration of a hydraulic line secured to a stiff conduit by a bracket.
Figure 6:
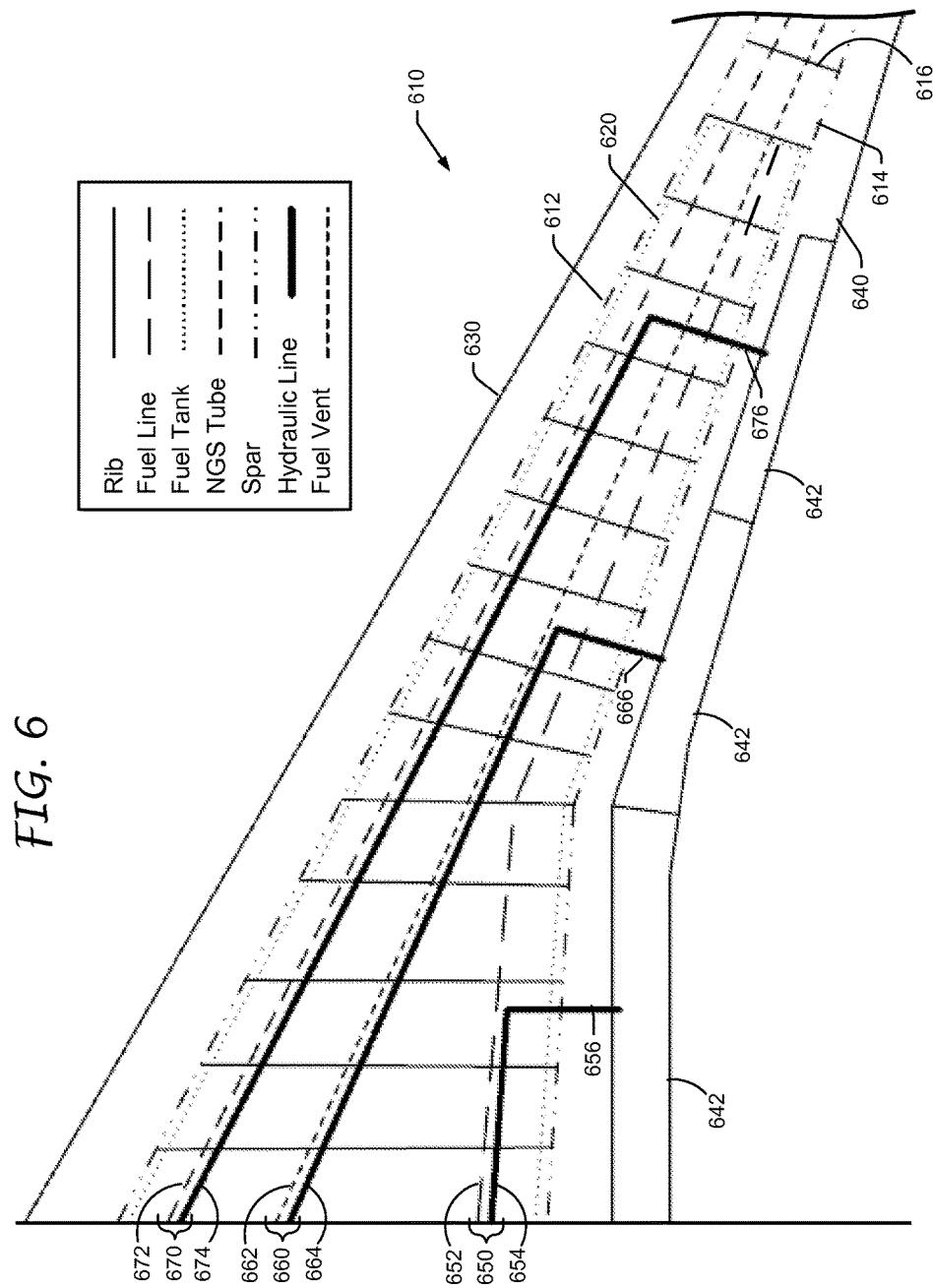
FIG. 6 is an illustration of a wing including conduits, and hydraulic lines that were pre-assembled into modules.
Figure 7:
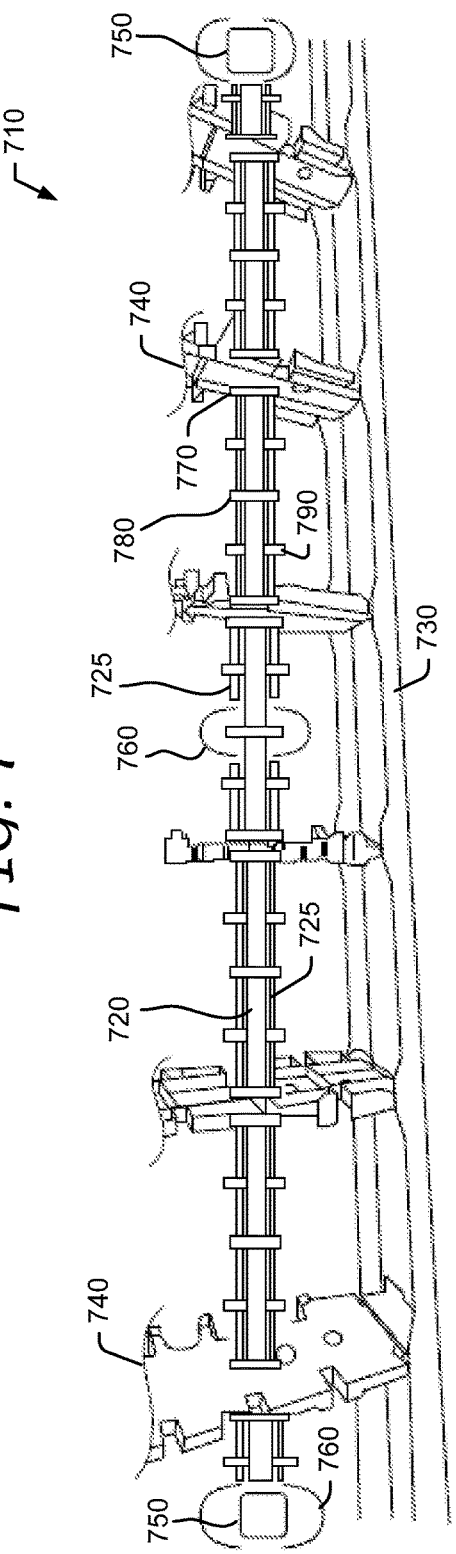
FIG. 7 is an illustration of a module including a fuel line and hydraulic line.

Referring to FIG. 5, a bracket 510 made of a non-conductive material secures a hydraulic line 530 to a fuel line 520. The bracket 510 sets an air gap G between the fuel line 520 and the hydraulic line 530 to electrically isolate the fuel line 520 from the hydraulic line 530. Thus, the bracket 510 prevents EME current from jumping between the fuel line 520 and the hydraulic line 530.

The bracket 510 prevents EME current from traveling along a first surface path P1 between the fuel line 520 and the hydraulic line 530. The bracket 510 also prevents EME current from traveling along a second surface path P2 between the hydraulic line 530 and the base of the bracket 510.

The bracket 510 may include inner and outer sleeves 540 and 550 for the fuel line 520, and inner and outer sleeves 560 and 570 for the hydraulic line 530. These sleeves 540-570 maintain the surface path P1 at a lower weight than would be achieved by separating the fuel line 520 and hydraulic line 530 so that the air gap G equals the surface path P1.

Using brackets herein, stiff conduits and hydraulic lines may be pre-assembled into modules. These modules may then be installed to frame members of an aircraft. In some embodiments, wires may also be preassembled into the modules. In other embodiments, wires are not pre-assembled and instead are secured to the brackets after the modules have been installed.

Advantageously, the modules provide long straight runs for the hydraulic lines. Instances of routing the hydraulic lines around obstacles (e.g., to brackets on frame members and skin panels) are reduced. Consequently, the installed hydraulic lines have fewer bends, need fewer brackets and connections, and can be fabricated for longer runs and lengths. Lighter weight and easier installation of the hydraulic lines reduces operating, fabrication and maintenance costs.

Examples will now be provided below in which modules of pre-assembled conduits and hydraulic lines are secured to the frame members. The examples will be provided for an aircraft wing.

Figure 3:
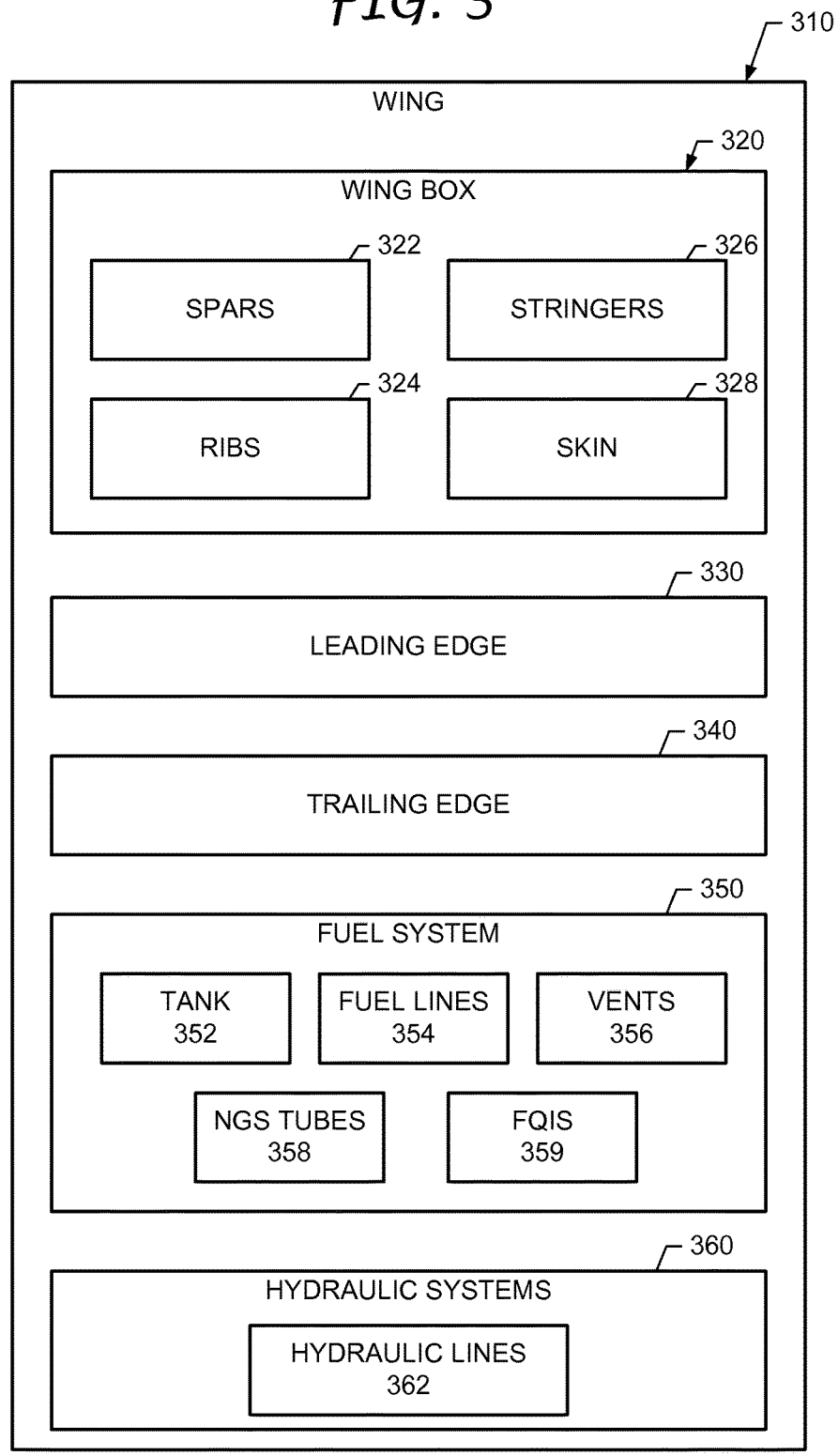
FIG. 3 is an illustration of elements of an aircraft wing.

Reference is now made to FIG. 3, which illustrates elements of a wing 310. The wing 310 includes a wing box 320 made up of spars 322, ribs 324, stringers 326, and skin 328. The wing 310 further includes leading and trailing edges 330 and 340. The leading edge 330 may include flight control surfaces such as slats. The trailing edge 340 may include flight control surfaces such as ailerons, flaps, and spoilers.

The wing 310 includes a fuel system 350. A fuel tank 352 is located within the wing box 320, and it is made up of the spars 322, ribs 324 and skin 328. Stiff conduits including fuel lines 354, fuel vents 356, and NGS tubes 358 may be located within the fuel tank 352. Some or all of these conduits 354-358 may extend through multiple ribs 324 along the length of the wing 310. Some of these conduits 354-358 may extend from spar 322 to spar 322.

The fuel system 350 further includes a fuel quantity indication system (FQIS) 359. Wires of the FQIS 359 may also extend through the fuel tank 352 and other regions of the wing 310.

The flight control surfaces may be actuated by hydraulic systems 360. The hydraulic systems 360 include hydraulic lines 362, which may extend through the fuel tank 352 and other regions of the wing 310.

During operation of the aircraft, the wing 310 flexes due to flight loads. Consequently, the hydraulic lines 362 may move. The hydraulic lines 362 may also move in response to hydraulic fluid pressure changes.

Reference is now made to 6, which illustrates a wing 610. The wing 610 includes front and rear spars 612 and 614 extending in a spanwise direction, and ribs 616 extending in a chordwise direction. The spars 612 and 614 and some of the ribs 616 form a fuel tank 620. The wing 610 further includes a leading edge 630 and a trailing edge 640 with hydraulically-actuated flight control surfaces 642.

Brackets are used to pre-assemble long straight runs of stiff conduits and hydraulic lines into modules. The modules include a first module 650 in which a fuel line 652 and a hydraulic line 654 are pre-assembled. The fuel line 652 in the first module 650 extends to the end of the fuel tank 620. The hydraulic line 654 in the first module 650 is connected to another hydraulic line 656, which makes a ninety degree bend and extends to a hydraulic actuator of an inboard control surface 642.

The modules include a second module 660 in which a vent 662 and a hydraulic line 664 are pre-assembled. The vent 662 in the second module 660 extends to the end of the wing 610. The hydraulic line 664 in the second module 660 is connected to another hydraulic line 666, which makes a ninety degree bend and extends to a hydraulic actuator of another control surface 642.

The modules include a third module 670 in which an NGS tube 672 and a hydraulic line 674 are pre-assembled. The NGS tube 672 in the third module 670 extends to the end of the wing 610. The hydraulic line 674 in the third module 670 is connected to another hydraulic line 676, which makes a ninety degree bend and extends to a hydraulic actuator of another control surface 642.

Reference is now made to 7, which illustrates a module 710 including a fuel line 720 and two hydraulic lines 725 that are located near a spar 730 and that has a straight run across six ribs 740. Fuel couplings 750 are used at opposite ends of the fuel line 720. Hydraulic expansion loops 760 are also used (six loops 760 are shown). Brackets 770 secure hydraulic lines 725 to the fuel line 720 and the fuel line 720 to the ribs 740. Other brackets 780 secure the hydraulic lines 725 to the fuel line 720. Still other brackets 790 space the hydraulic lines 725 apart from the fuel line 720.

Figure 8:
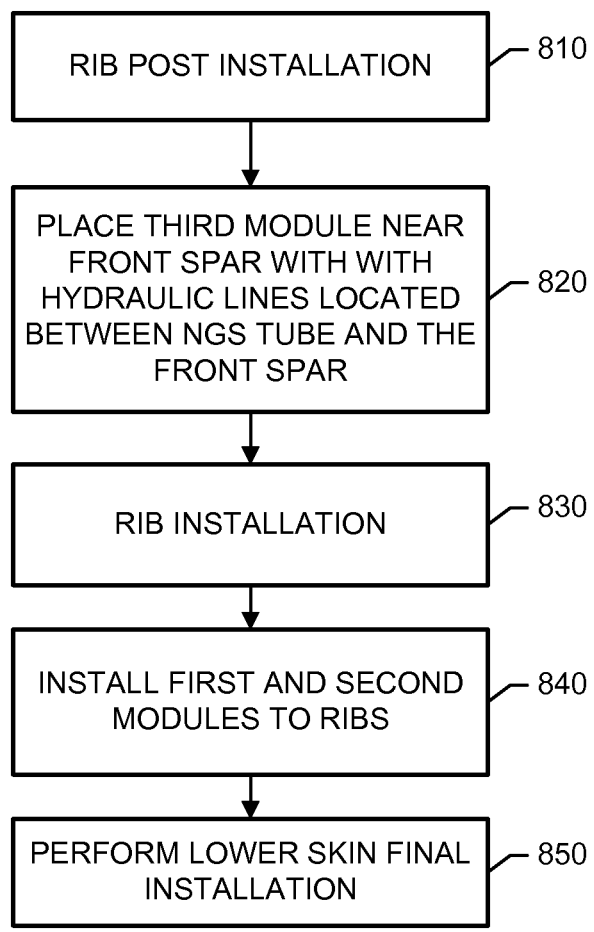
FIG. 8 is an illustration of a method of installing stiff conduits and hydraulic lines in a wing.
Figure 9:
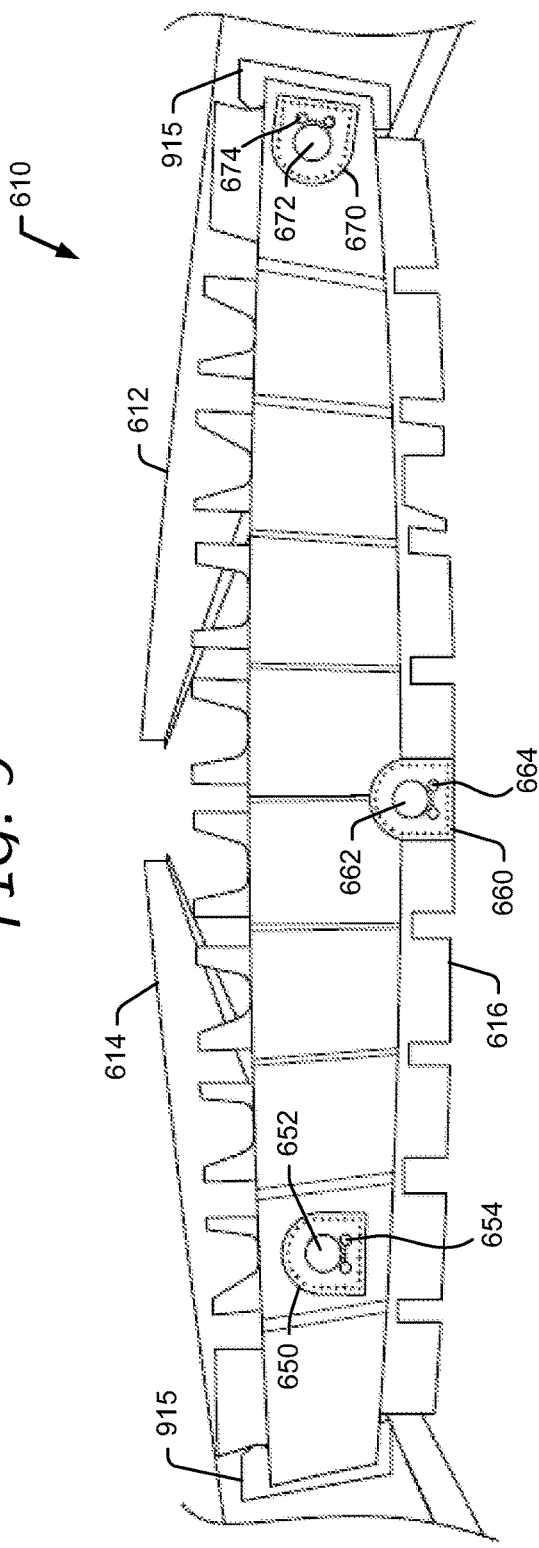
FIG. 9 is an illustration of a wing during assembly.

Reference is now made to FIGS. 8 and 9, which illustrate a method of installing modules in the wing 610. At block 810, rib posts 915 are fastened to the spars 612 and 614. At block 820, the third module 670 is installed after the rib post 915, but prior to rib installation. The third module 670 is placed near the front spar 612, with the hydraulic lines 674 located between the NGS tube 672 and the front spar 612.

At block 830, ribs 616 are installed to the rib posts 915. Openings at sides of the ribs 616 are placed over the NGS tube 672 and hydraulic lines 674. The brackets of the third module 670 are fastened to the ribs 616.

At block 840, the first module 650 is installed. The first module 650 may be inserted through openings in the ribs 616, with the hydraulic lines 654 oriented beneath the fuel line 652. Brackets of the first module 650 are fastened to the ribs 616.

Also at block 840, the second module 660 is installed. The second module 660 may be placed into openings at lower edges of the ribs 616, with its brackets fastened to the ribs 616. The second module 660 may be installed after upper skin has been installed, and after the lower skin has been drilled and deburred, but before lower skin has been installed. By installing the second module 660 at this time, there is less chance of damaging the vent tube 662 and hydraulic lines 664 of the second module 660.

At block 850, the lower skin is installed.

Installation and maintenance of pre-assembled modules is faster than installing and maintaining separate fuel lines, hydraulic lines and wires. And because runs are straight, the hydraulic lines have fewer bends, need fewer brackets and connections, and don't need to be lengthened or upsized.

The pre-assembled modules offer other advantages. They enable the hydraulic lines to be placed closer to the spars. This, in turn, enables the hydraulic lines to be placed closer to flight control surfaces, thereby reducing length of the hydraulic lines.

Locating the pre-assembled modules closer to the spars also increases the distance of the lines from access ports. Consequently, there is less chance of damage from mechanics (who enter the wing box through these access ports). Moreover, the stiff conduits can shield the hydraulic lines from damage by mechanics.

The pre-assembled modules may also be used in an aircraft fuselage and empennage. In the fuselage, for example, hydraulic lines and wires for landing gear may be attached to a duct of an environmental control system.

The invention claimed is:

1. A method of installing a hydraulic line in an aircraft having frame members, the method comprising:
assembling a module independent of the aircraft, the module comprising:
the hydraulic line;
a stiff conduit; and
at least one bracket extending between the hydraulic line and the stiff conduit thereby to support the hydraulic line from the stiff conduit independent of the frame members; and
attaching the module to the frame members of the aircraft.

2. The method of claim 1, wherein the stiff conduit is a fuel line.

3. The method of claim 1, wherein the stiff conduit is one of a fuel vent and a nitrogen generation system tube.

4. The method of claim 1, wherein the stiff conduit does not bend or move appreciably between the frame members, whereas the hydraulic line tends to bend and move in response to hydraulic fluid pressure changes.

5. The method of claim 1, wherein attaching the module to the frame members of the aircraft comprises securing the at least one bracket to one of the frame members.

6. The method of claim 5, wherein the module further comprises at least one additional bracket configured to secure an intermediate potion of the hydraulic line to the stiff conduit.

7. The method of claim 6, wherein the module further comprises electrical wires secured to the stiff conduit by the at least one bracket and the at least one additional bracket.

8. The method of claim 6, wherein each bracket includes openings for the stiff conduit and the hydraulic line, the openings setting a minimum gap sufficient to electrically separate the stiff conduit and the hydraulic line.

9. The method of claim 5, wherein the frame members are made of a fiber-reinforced composite material and the stiff conduit is made of a non-conductive material.

10. The method of claim 1, wherein the aircraft frame members include wing ribs and wherein the stiff conduit extends through the wing ribs.

11. The method of claim 10, wherein the module is secured to the ribs before installation of an upper or a lower skin panel.

12. The method of claim 10, wherein the module is located near spars and secured to ribs between rib post installation and rib installation.

13. An aircraft comprising:
frame members; and
a module assembled independent of the aircraft and attached to the frame members, the module including:
a stiff conduit;
a hydraulic line; and
a plurality of brackets extending between the hydraulic line and the stiff conduit to support the hydraulic line from the stiff conduit independent of the frame members.

14. The aircraft of claim 13, wherein the frame members include wing ribs; and wherein at least some of the brackets also secure the stiff conduit to the wing ribs.

15. The aircraft of claim 13, wherein the frame members include ribs; and wherein the stiff conduit, hydraulic line, and plurality of brackets are located within a fuel tank.

16. The aircraft of claim 13, wherein the stiff conduit is one of a fuel line, NGS tube, and fuel vent.

17. A pre-assembled module for installation in an aircraft having frame members, the module consisting of:
a stiff aircraft fuel line,
a hydraulic line,
electrical wires, and
a plurality of brackets extending between the stiff aircraft fuel line and the hydraulic line and electrical wires, thereby to support the hydraulic line and the electrical wires from the stiff aircraft fuel line independent of the frame members.

18. The module of claim 17, wherein the fuel line is straight.

* * * * *